United States Patent [19]

Bianchi

[11] Patent Number: 5,101,720

[45] Date of Patent: Apr. 7, 1992

[54] DOUBLE-HINGED GARLIC PRESS/GRATER

[76] Inventor: Stephan Bianchi, 1353 Todd St., Mountain View, Calif. 94040-2929

[21] Appl. No.: 639,979

[22] Filed: Jan. 11, 1991

[51] Int. Cl.⁵ .................. B30B 15/00; B30B 9/06
[52] U.S. Cl. ...................... 100/99; 99/506; 100/112; 100/125; 100/234; D7/666
[58] Field of Search ............... 100/99, 112, 116, 125, 100/234, 243; 99/506, 508; D7/665, 666

[56] References Cited

U.S. PATENT DOCUMENTS

| 216,699 | 6/1879 | Reynolds | 100/234 X |
|---|---|---|---|
| 240,858 | 5/1881 | Steber | 100/234 X |
| D. 293,757 | 1/1988 | Pedrini | D7/666 |
| 386,694 | 7/1888 | Edie | 100/234 X |
| 581,526 | 4/1897 | Straube | 100/234 X |
| 620,047 | 2/1899 | Neal | 100/125 X |
| 628,470 | 7/1899 | James | 100/234 |
| 694,617 | 3/1902 | Coomber | 100/234 X |
| 726,075 | 4/1903 | Kress | 100/234 X |
| 980,466 | 1/1911 | Williams | 100/116 X |
| 1,399,708 | 12/1921 | Ferdon | 100/234 X |
| 1,457,478 | 6/1923 | Williams et al. | 100/234 X |
| 1,938,463 | 12/1933 | Roberts | 100/125 X |
| 1,939,307 | 12/1933 | Majewski | D7/666 |
| 2,220,458 | 11/1940 | Osterman | 100/125 X |
| 2,776,616 | 1/1957 | Sarossy | 100/125 X |
| 3,327,621 | 6/1967 | Zysset | 100/125 |
| 4,069,752 | 1/1978 | Ahner | 100/112 |
| 4,466,346 | 8/1984 | Gemelli | 100/112 |
| 4,545,299 | 10/1985 | Ahner | 100/112 |

FOREIGN PATENT DOCUMENTS

| 919968 | 11/1954 | Fed. Rep. of Germany | 100/234 |
|---|---|---|---|
| 1093394 | 5/1955 | France | 100/234 |
| 313348 | 5/1956 | Switzerland | 100/234 |

Primary Examiner—Harvey C. Hornsby
Assistant Examiner—Stephen F. Gerrity

[57] ABSTRACT

An easily-cleaned press and grater combination, which can press, extrude and grate material. It also serves to collect and hold material. It opens to release the material and to expose all surfaces for cleaning. It comprises a first cup (12) with a first lever (16) attached to one side. Opposite the lever, the wall of the cup is formed by a first grate (26). This is held on by two hinge pins. The first hinge pin (38) is held at the bottom of the cup. The second hinge pin (20) snaps into the rim of the cup. A second cup (10) nests in the first cup. It is similar to the first, but has a solid wall (18) instead of a grate. The second cup also has a lever (14). A second grate (26) is interchangeable with the first. It shares the second hinge pin with it. The second grate snaps over a cavity (54) on the second cup into a recess (34). Exclusive of the grate and levers, the nesting surfaces of the two cups are concentric about the second hinge. The hinge pins are held in by dimples (44a, 44b, 44c) in the grate hinges which nest in central grooves (42a, 42b). External grooves (46a, 46b, 46c, 46d) accept prying tools for the purpose of extracting the pins. A graduation mark (50) allows measurement of pressed material.

11 Claims, 4 Drawing Sheets

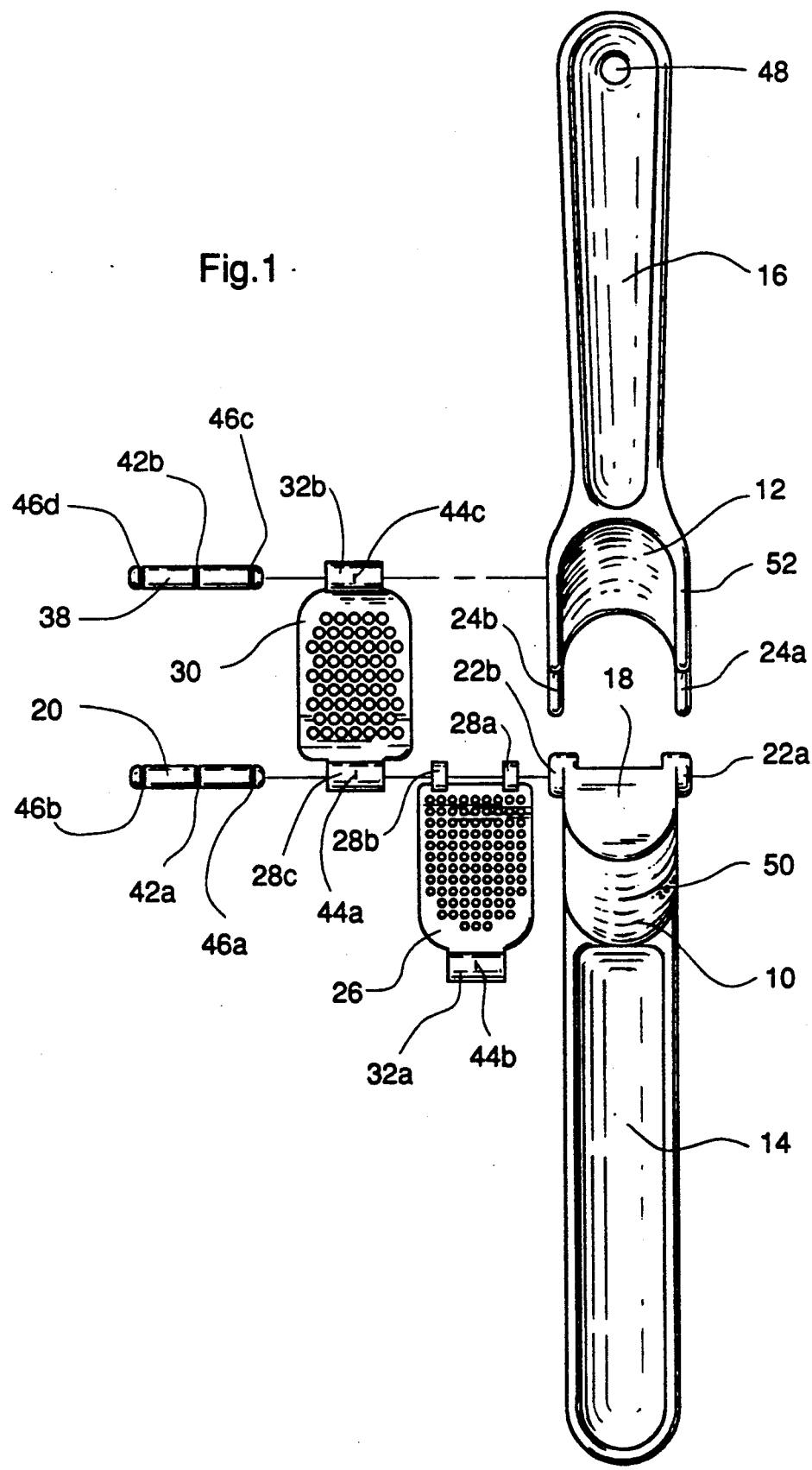

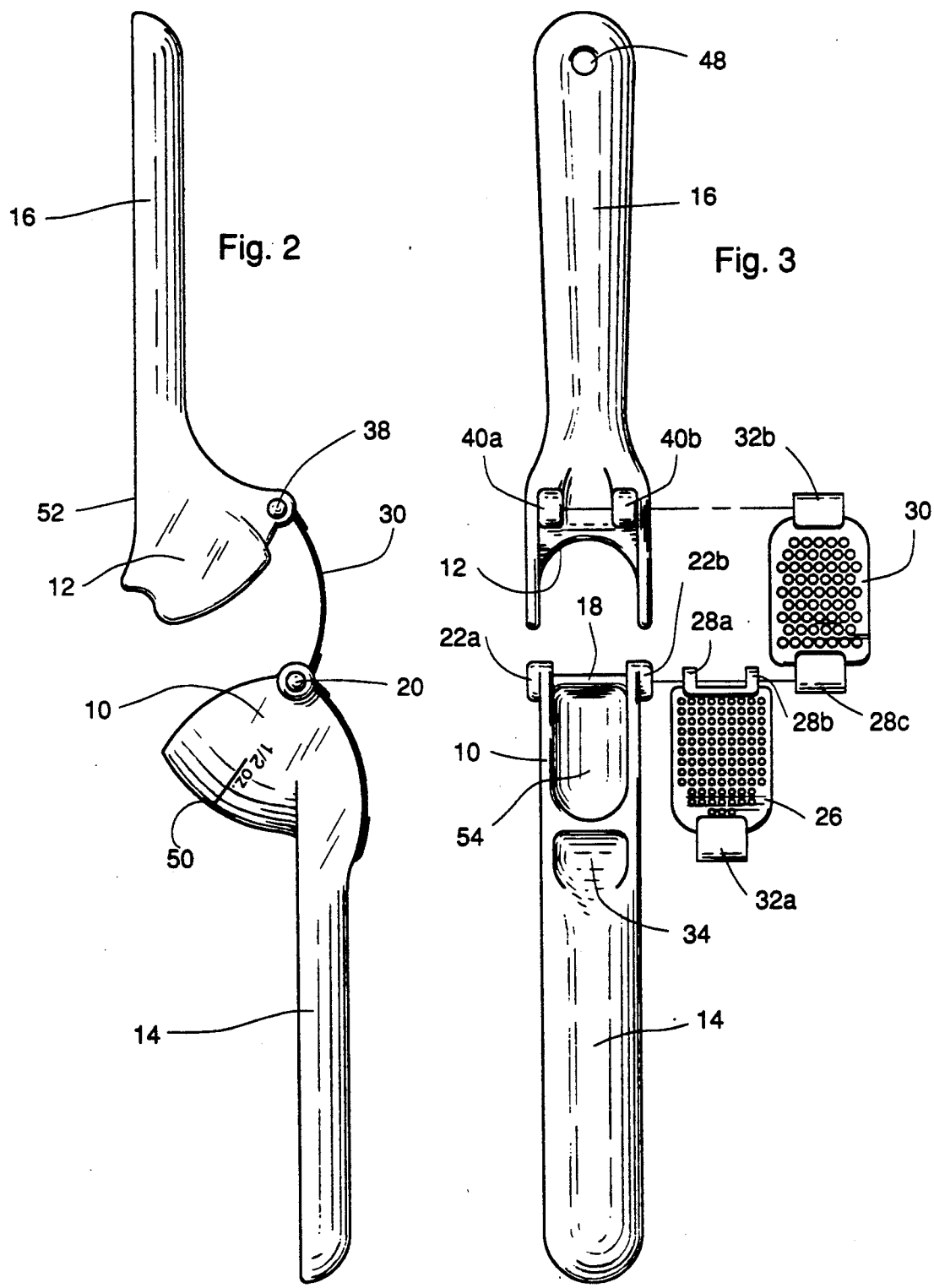

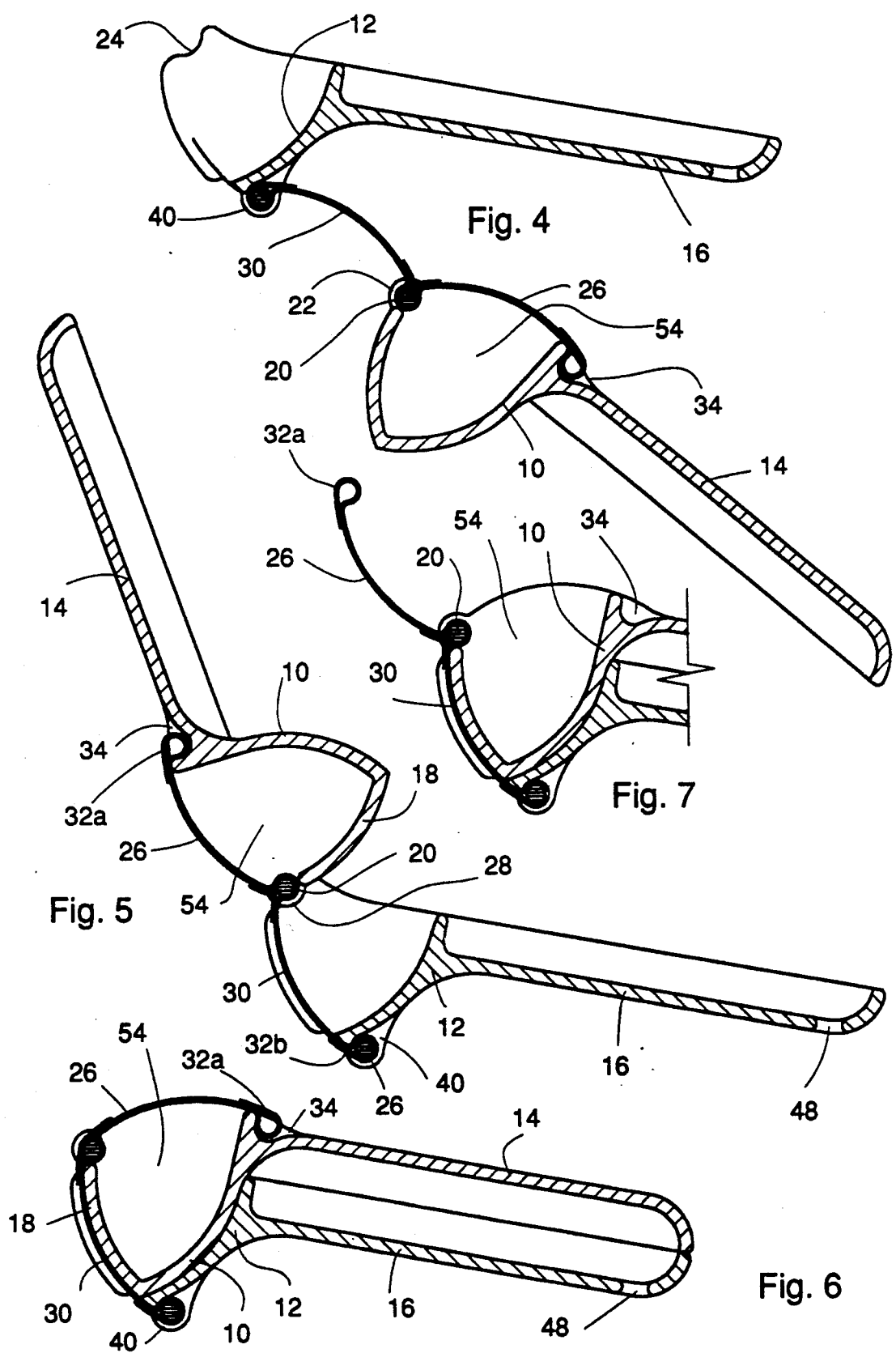

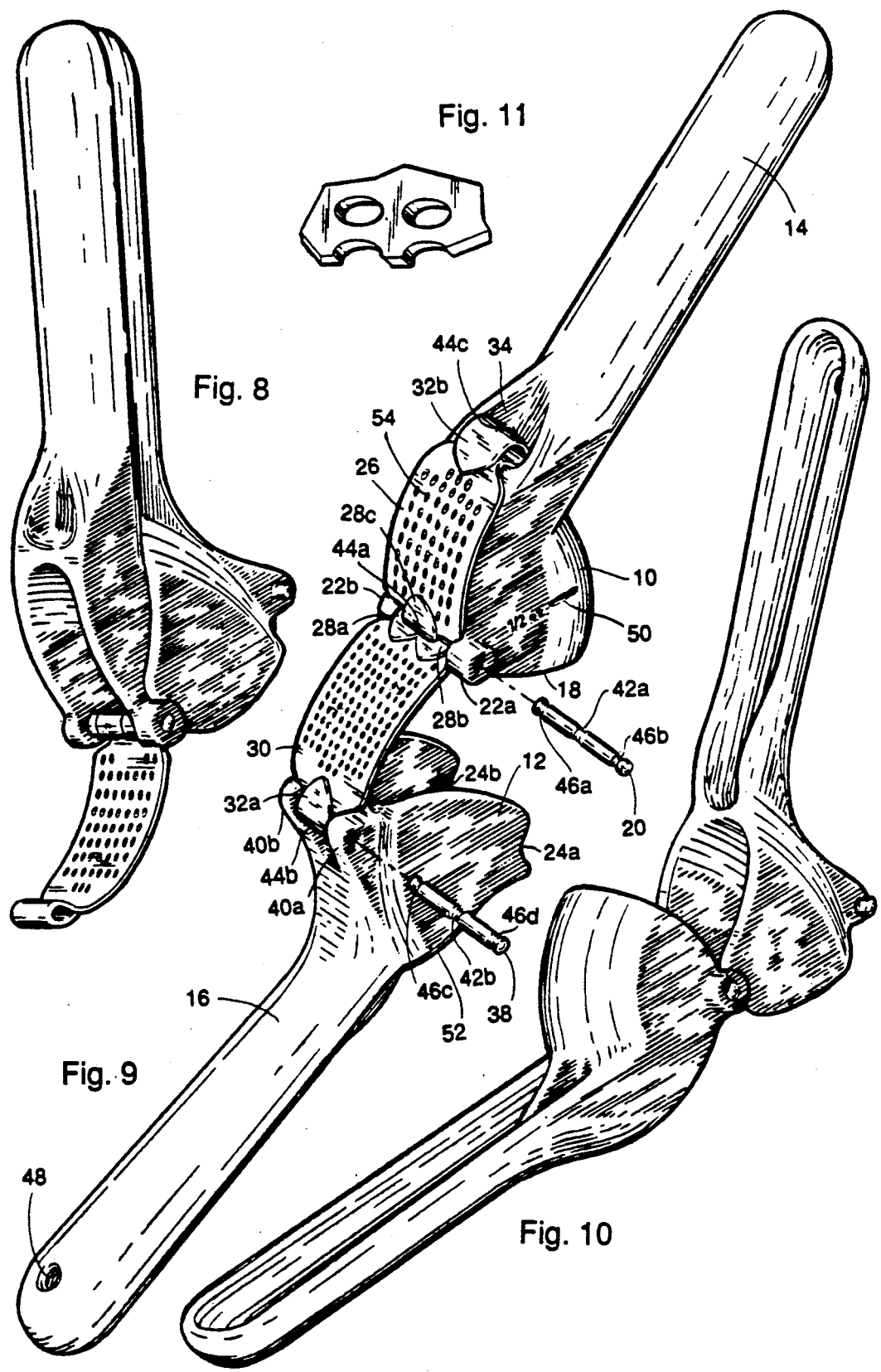

DOUBLE-HINGED GARLIC PRESS/GRATER

BACKGROUND

1. Field of Invention:

This invention relates to kitchenware, specifically to presses and graters used to shred and extract juice from garlic and the like.

2. Prior Art

Freshly crushed garlic is frequently required in recipies. Generally, the garlic to be crushed is placed into a cup or receiver. A ram or piston is forced into the cup, pressing the garlic through holes in a perforated grate or sieve.

Heretofore, presses used to crush garlic had corners and crevices which retained sticky, fiberous residue from the crushed garlic. In particular, the perforated grate through which the juice was pressed was difficult to clean because of its inherent intricacy and its location at the bottom of a cup. Also, its interior surface joined the interior of the cup at right angles, creating an inaccessible crevice. A solution to the problem of cleaning the grate was to make it detachable. However, detachable grates were retained by crevices in the cup which made the cup no less difficult to clean. Also the detached grates were difficult to hold for cleaning and thus were easy to lose.

Another solution was to provide combs, which, when inserted into the grate, served to dislodge residue. These added to the cost and complexity and were nearly as hard to clean as the grates themselves had been. Also, some of these combs were separate and hence easy to lose.

Another common problem was that the plunger did not slide sufficiently tightly into the cup. This allowed material to escape pressing and to make a mess. The reason for this imprecision was that the presses were made of plastic or metal that was cast or drawn in a die. In order for the parts to be removed from the die without undue friction, they were tapered in such a way that surface-to-surface contact between the parts and the die was eliminated as soon as the dies were parted. When the plunger and cup were assembled, their relationship resembled their former relationships to the dies, so that the taper prevented proper surface-to-surface seal until the mechanism reached the end of its travel.

Garlic and other condiments, such as ginger or parmesan cheese, sometimes require grating or pressing. Heretofore, garlic presses often had grates of cast plastic or aluminum and therefore lacked hard, sharp edges useful for grating these foods. Thin stainless steel grates, when supplied, were either interchangeable and not securely attached, or they had holes too fine for use in grating. Also, it was undesirable to use presses or graters used on garlic for other operations because the smell of the garlic, which was so difficult to remove, would thereby contaminate other foods.

OBJECTS AND ADVANTAGES

Accordingly, several objects and advantages of my invention are to provide a garlic press which is easy to clean, which can be cleaned without having to resort to complicated and unsanitary combs, which can be made with all smooth, curved surfaces, which has few crevices to retain residue, which opens so that its surfaces can be exposed for cleaning, which has parts which all remain united, even when unfolded, to facilitate holding while cleaning and to prevent loss, which has nesting parts to maintain a proper seal during operation, which has sharp grates and large rounded handles so as to serve as a miniature grater that is easy to hold.

Additional objects are to provide a press which includes a receptacle for processed and unprocessed condiments, which may be disassembled easily for exchanging pressing and grating implements or replacing grates.

Further objects and advantages will become apparent from a consideration of the drawings and ensuing description.

DRAWINGS FIGURES

FIG. 1 is a top plan view of a combined grater/press according to my invention in an unassembled state.

FIG. 2 is a side elevational view of the grater/press.

FIG. 3 is a bottom plan view showing the grater/press unassembled, without the hinge pins.

FIGS. 4, 5, and 6 are longitudinal sectional views of the grater/press in various positions.

FIG. 7 is a partial longitudinal sectional view of the grater/press in another position.

FIGS. 8, 9, and 10 are perspective views of the grater/press in various positions.

FIG. 11 is a detailed perspective view of the grater holes.

REFERENCE NUMERALS IN DRAWINGS

10: plunger
12: receiver
14: plunger lever
16: receiver lever
18: plunger wall
20: plunger hinge pin
22a, 22b: plunger hinge guides
24a, 24b: receiver recesses
26: plunger hinged wall
28a, 28b, 28c: inner hinge guides
30: receiver hinged wall
32a, 32b: outer hinge guides
34 plunger recess
38: receiver hinge pin
40a, 40b receiver hinge guides
42a, 42b: central annular grooves
44a, 44b, 44c dimples
46a, 46b, 46c, 46d: lateral annular grooves
48 hanging hole
50: graduation mark (½ oz.)
52 rim of outer cup
54: plunger cavity.

DESCRIPTION OF PREFERRED EMBODIMENT

FIGS. 1, 2, and 3 show a garlic press according to my invention in an open and unassembled state. The press comprises two major parts: a ram or plunger 10 with its handle or operation lever 14 and a receiver 12 with its handle or lever 16. Plunger 10 and receiver 12 take the form of two nesting cups (FIGS. 5 and 6).

The two major parts are held together by a double-hinged arrangement, including a perforated wall 30 (FIG. 2) which has one end pivotably attached to receiver 12 and on the opposite end, pivotably attatched to plunger 10. It can be pivoted away from receiver 12 upon a pin 38 at one end of wall 30. The other end of wall 30 is pivotably attatched to plunger 10 by a pin 20 (FIGS. 2 and 4). A similar, perforated wall 26, has one end which pivots on pin 20. Its other end snaps into a recess 34, situated at the union of plunger 10 and lever 14. Plunger 10 has a cavity 54 (FIG. 7) which is enclosed by wall 26. Pin 20 also extends through, and is held by, a pair of guides 22a and 22b (FIG. 1) on plunger 10. It also extends through two additional guides 28a and 28b on wall 26 and a guide 28c on wall 26 which guide is sandwiched between guides 28a and 28b.

Pin 38 extends through a guide 32b in wall 30 and a pair of guides 40a and 40b (FIG. 3) on receiver 12. Guides 22a and 22b on plunger 10 snap into recesses 24a and 24b, thereby holding wall 30 to receiver 12 (FIGS. 1 and 5). A guide 32a, identical to guide 32b, provides the means for wall 26 to snap into recess 34. (FIGS. 3 and 5).

Guides 22a, 22b, 24a, 24b, 40a and 40b comprise integral ears or projections (with appropriate recesses or through holes) on the plunger and receiver, while guides 28a, 28b, 32a, 32b, and 28c comprise bent-around tabs on walls 26 and 30 (FIGS. 8–12).

Pins 20 and 38 (FIG. 1) have central annular grooves 42a and 42b which are engaged by dimples 44a, and 44c, respectively, in guides 28c and 32b to retain the pins. Lateral annular grooves 46a, 46b, 46c, and 46d are situated adjacent the ends of pins 20 and 38 to provide a grip to withdraw the pins. A hole 48 on handle 16 allows the press to be hung to dry or to be close at hand. As shown in FIG. 2, a graduation mark 50 is provided on plunger 10 to align with the rim 52 of the outer cup to measure material.

The cup and handle parts preferably are cast from aluminum. The grates preferably are formed from stainless steel straps with bent-over end-tabs which are spot-welded to form the hinge guides. They are 1 mm thick and have oval holes punched at a 60-degree angle by circular punches with diameters of 2 mm (wall 26) and 3 mm (wall 30). The 60 degree angles of the hole edges present a sharp grating surface. The hinge pins preferably are stainless steel.

OPERATION—PRESSING

To operate the press, the walls 30 and 26 are snapped into place. Lever 16 is held in one hand while lever 14 is swung up to expose the receiver 12. Cloves of garlic or any other pressable food (not shown) is placed in receiver 12 (FIG. 5). Then, levers 14 and 16 are drawn together are held in the palm of one hand (not shown). The user squeezes the levers together (FIG. 6). This forces plunger 10 into receiver 12, pressing the food into wall 30. The crushed garlic is thereby extruded through the relatively large holes in wall 30.

Then, the user pulls levers 14 and 16 apart, causing wall 18 to be withdrawn. Wall 30 can now be unsnapped from receiver 12. It pivots on pin 38, and swings away to expose itself for easy and complete cleaning, as seen in FIGS. 4 and 2.

To replace the grates, the press is disassembled as shown in FIGS. 1, and 3, The two grates are first unsnapped. Pin 38 is pushed and pulled out, free of its captivation by dimples 44 in grooves 42. Pin 38 may now be used to poke out pin 20 until one of the fingernail-engageable grooves 46a or 46b is exposed. At this point, pin 20 may be pulled out. If desired, walls 26 and 30 may now be interchanged so that the smaller perforations of wall 26 can be used in the press to extract clear juice, and so that the larger perforations of wall 30 can be used over plunger 10 for coarser grating of parmesan cheese.

When levers 14 and 16 are together (FIG. 6), guide 32a is snapped into place in cavity 34. This secures wall 26, which may then be used to scrape or grate foods such as garlic, ginger, or parmesan cheese. The hard cheese is held with the fingers and thumb of one hand upon a countertop. The grater is held in the other hand and is rubbed back and forth across the cheese. Alternatively, the grater is held with guides 40a and 40b resting on the surface of a countertop. The cheese is then rubbed over wall 30 towards pin 20. The perforations in wall 30 scrape off granules of the cheese which pass through the holes and collect within cavity 54.

Other foods, such as garlic cloves, ginger root, or nuts, grated or not, may be stored in cavity 54. Wall 26 may be unsnapped to uncover the contents of cavity 54 and to expose the device for cleaning, as shown in FIG. 7.

The contents may then be transferred to receiver 12 where they can be measured by compressing them with plunger 10, until graduation mark 50 (represented here by the single ½-oz. mark) is against rim 52 of receiver 12. The small holes of wall 26 will tend to prevent granular material from sifting out during this operation.

SUMMARY, RAMIFICATIONS, AND SCOPE

Accordingly, the reader will see that the garlic press of this invention is easier to clean than any other because it has no small cavities to collect undesireable residues. With the exception of the interiors of the hinges, all surfaces of the parts can be exposed for cleaning without disassembly (FIG. 4). All parts can be locked together to provide handles to hold the grates while cleaning. This serves to minimize the likelihood of their loss. It can be entirely disassembled without tools. This facilitates the substitution or replacement of parts. The plunger and cup can be cast in such a way that there is an uncommonly tight seal between them because the arcuate path of the plunger in and out of the cup does not resemble the linear path of the plunger or the cup as it leaves the mold. This tight seal prevents materials from escaping during the pressing operation. The grates, though they occupy convenient positions on the cast handles, are made of sheet metal. This allows them to be made thin and hard enough to be used as graters. Their interchangeability provides a choice of juicing, crushing, or grating. If one grate breaks, the other can serve in the same capacity until a replacement can be found. The grates may be used to scrape and peel garlic prior to pressing, or to grate ginger or nutmeg. The plunger with its graduations allows spongy, springy, or odd-shaped materials, such as grated coconut, nuts, berries, or lumps of pollen to be compressed for accurate volumetric measurement. This press is equal, if not superior, to all known garlic presses in all operational respects.

While my above description contains many specificities, these should not be construed as limitations on the scope of the invention, but rather as an exemplification of one preferred embodiment thereof. Many other variations are possible. The perforations can be omitted entirely, they can be larger or smaller, triangular, square, or star-shaped. The cups can be made larger or smaller. With such modifications, the press can be used to press oil from nutmeats or juice from grapes, individually or in quantity. A suitably enlarged version of the same device can be used to press larger items, such as lemons, limes, oranges, grapefruit, and even watermelon.

The double-hinged grate configuration is useful in a wide range of pressing situations. These include various situations in which caked or fibrous non-edible material is to be solidified or pulverized or separated from liquid, especially when the process must be clean and positive. Sample applications include compressing moist compounds into tablets, or crushing sugar cubes into granules. This configuration can be used to expel oil or water from a sponge or solvent from a sponge or fiber filter.

The grates may be replaced by extrusion gates for the purpose of extruding materials such as frostings, gels, or foams. Embossed plates or flexible screens may be substituted for the grates for the purpose of molding a material, such as butter or chocolate. Wall 26 may be integral or omitted. Cavity 54 may be omitted so that plunger 10 may be reduced to a flange.

Metric or other graduations, singular or several, may be provided on the plunger, instead of the half-ounce mark shown. An unperforated plate may be provided for the measurement of finer materials.

Accordingly, the scope of the invention should be determined not by the embodiments illustrated, but by the appended claims and their legal equivalents.

I claim:

1. A press for changing the shape of materials, or for separating solids from liquids comprising:
    a cup having a bottom and an open mouth opposite said bottom, said cup forming a cavity, said open mouth being surrounded by a rim, a plurality of walls extending down from said rim to said bottom, one of said walls being attached to said bottom by a hinge and being rotatable out and away from the rest of said cup on said hinge to an open position, said one wall having an upper edge forming a portion of said rim when said wall is rotated on said hinge in and against the rest of said cup to a closed position, and
    a ram shaped to mate conformingly with said cavity, said ram being attatched by a second hinge to said upper edge of said one wall such that when said one wall is in its closed position, said ram can be rotated on said second hinge into a mated position within and mated into said cavity such that said ram substantially sweeps said cavity, or away to an unmated position such that said ram is substantially entirely outside of said cavity, whereby said ram can be rotated into said cavity to squeeze foods or other materials in said cavity, yet can be easily cleaned by opening said one wall and unmating said ram.

2. The press of claim 1, further including a lever attached to said cup and a lever attached to said ram so that said press may be manually operated.

3. The press of claim 1 wherein said one wall is in the form of a leaf-spring connected between said hinges, and further including a holding recess in said cup so that said wall can snap into said recess so as to hold it against the rest of said cup.

4. The press of claim 3, further including a second, interchangeable wall attached by means of a hinge and snapping into a recess on a reverse side of said ram said second wall being interchangeable with said one wall.

5. The press of claim 4 wherein said one wall and said second wall are foraminous.

6. The press of claim 5 wherein the holes in said one wall are different in size or shape from those in said second wall.

7. The press of claim 3 wherein said hinges are held to said cup and ram by recesses.

8. The press of claim 1 wherein said one wall is foraminous.

9. The press of claim 1, further including a graduation marked on said ram.

10. The press of claim 1 wherein said cup and said ram are generally U-shaped.

11. The press of claim 1 wherein a cavity fills the space behind said ram.

* * * * *